(12) United States Patent
Carlino et al.

(10) Patent No.: US 7,948,343 B2
(45) Date of Patent: May 24, 2011

(54) SETTINGS EMULATOR FOR A CIRCUIT INTERRUPTER TRIP UNIT AND SYSTEM INCLUDING THE SAME

(75) Inventors: Harry J. Carlino, Export, PA (US); Todd M. Shaak, Presto, PA (US); Brian S. Caffro, Aliquippa, PA (US); Joseph B. Humbert, Monaca, PA (US)

(73) Assignee: Eaton Corporation, Cleveland, OH (US)

( * ) Notice: Subject to any disclaimer, the term of this patent is extended or adjusted under 35 U.S.C. 154(b) by 380 days.

(21) Appl. No.: 12/164,413

(22) Filed: Jun. 30, 2008

(65) Prior Publication Data

US 2009/0326900 A1 Dec. 31, 2009

(51) Int. Cl.
*H01H 73/00* (2006.01)
(52) U.S. Cl. ...................................................... 336/115
(58) Field of Classification Search .................... 361/115
See application file for complete search history.

(56) References Cited

U.S. PATENT DOCUMENTS

| | | | | |
|---|---|---|---|---|
| 4,245,318 | A | * | 1/1981 | Eckart et al. ..................... 702/67 |
| 4,991,042 | A | * | 2/1991 | Tokarski et al. ............. 361/93.2 |
| 5,237,692 | A | * | 8/1993 | Raasch et al. ................. 710/267 |
| 5,341,191 | A | | 8/1994 | Crookston et al. |
| 5,825,643 | A | * | 10/1998 | Dvorak et al. .................. 700/12 |
| 5,872,722 | A | | 2/1999 | Oravetz et al. |
| 5,910,760 | A | | 6/1999 | Malingowski et al. |
| 6,005,757 | A | | 12/1999 | Shvach et al. |
| 6,144,271 | A | | 11/2000 | Mueller et al. |
| 6,252,365 | B1 | | 6/2001 | Morris et al. |
| 6,697,240 | B2 | | 2/2004 | Nelson et al. |
| 6,868,349 | B2 | * | 3/2005 | Fletcher et al. ................. 702/62 |
| 6,985,784 | B2 | | 1/2006 | Vandevanter et al. |

* cited by examiner

*Primary Examiner* — Jared J Fureman
*Assistant Examiner* — Scott Bauer
(74) *Attorney, Agent, or Firm* — Martin J. Moran (57) ABSTRACT

A settings emulator for a circuit breaker trip unit includes a handheld enclosure and a plurality of adjustable rotary switches mounted on the handheld enclosure. The adjustable rotary switches define a plurality of different trip settings for the circuit breaker trip unit. A communication channel is also mounted on the handheld enclosure. A microprocessor is enclosed by the handheld enclosure. The processor reads the different trip settings from the adjustable rotary switches and communicates the different trip settings through the communication channel to the circuit breaker trip unit.

22 Claims, 8 Drawing Sheets

SETTINGS EMULATOR FOR A CIRCUIT INTERRUPTER TRIP UNIT AND SYSTEM INCLUDING THE SAME

BACKGROUND OF THE INVENTION

1. Field of the Invention

This invention pertains generally to circuit interrupters and, more particularly, to circuit interrupter electronic trip units configurable through a plurality of adjustable switches. The invention also pertains to systems including circuit interrupter electronic trip units.

2. Background Information

Electrical switching apparatus such as circuit interrupters and, in particular, circuit breakers of the molded case variety, are well known in the art. See, for example, U.S. Pat. No. 5,341,191.

Circuit breakers are used to protect electrical circuitry from damage due to an overcurrent condition, such as an overload condition or a relatively high level short circuit or fault condition. Molded case circuit breakers typically include a pair of separable contacts per phase. The separable contacts may be operated either manually by way of a handle disposed on the outside of the case or automatically in response to an overcurrent condition. Typically, such circuit breakers include an operating mechanism, which is designed to rapidly open and close the separable contacts, and a trip unit, which senses overcurrent conditions in an automatic mode of operation. Upon sensing an overcurrent condition, the trip unit trips the operating mechanism to a trip state, which moves the separable contacts to their open position.

Industrial circuit breakers often use a circuit breaker frame, which houses a trip unit. See, for example, U.S. Pat. Nos. 5,910,760; and 6,144,271. The trip unit may be modular and may be replaced, in order to alter the electrical properties of the circuit breaker.

It is well known to employ trip units which utilize a microprocessor to detect various types of overcurrent trip conditions and to provide various protection functions, such as, for example, a long delay trip, a short delay trip, an instantaneous trip, and/or a ground fault trip. The long delay trip function protects the load served by the protected electrical system from overloads and/or overcurrents. The short delay trip function can be used to coordinate tripping of downstream circuit breakers in a hierarchy of circuit breakers. The instantaneous trip function protects the electrical conductors to which the circuit breaker is connected from damaging overcurrent conditions, such as short circuits. As implied, the ground fault trip function protects the electrical system from faults to ground.

Each circuit breaker is designed for a specific maximum continuous current. This current rating may be set by a suitable selection mechanism, such as by a rotary switch or by selection of a resistor (e.g., a "rating plug") which converts a current to a voltage for use by the trip unit. In some instances, a single circuit breaker frame may be easily adapted for installations which call for a range of maximum continuous currents, up to the design limits of the frame, through use of the selection mechanism by which the current rating of the device can be established. Typically, the pick-up currents for the various protection functions have been selectable multiples or fractions of this current rating. Thus, instantaneous protection trips the device any time the current reaches a selected multiple of the rated current, such as, for example, ten times the rated current. Pick-up for short delay protection is a lesser multiple of the rated current, while pick-up current for long delay protection may be a fraction of the rated current. Typically, the short delay trip is only generated when the short delay pick-up current is exceeded for a short delay time interval, although, in some applications, an inverse time function is also used for short delay protection.

Currently, many electronic trip units use adjustable (e.g., without limitation, rotary) switches to vary functional trip settings, such as, for example and without limitation, long delay pickup (Ir), long delay time (LDT), short delay pickup (SDPU), ground fault pickup (GFPU), and short delay time and ground fault time (SDT/GFT). The adjustable switches are typically labeled on a per unit basis and are common to all current sensor (e.g., current transformer) types. The Ir adjustable switch is based upon a percentage of the current sensor. For example, the Ir adjustable switch has eight positions. The lowest position represents 40% of the current sensor rating and the highest position corresponds to 100% of the current sensor rating.

Manufacturers of circuit interrupters readily seek to reduce the size and cost of circuit interrupters and electronic trip units. Hence, it is desirable to maintain the full functionality of an electronic trip unit while reducing its cost. It is also desirable to eliminate components of an electronic trip unit while also maintaining all its functions.

It is known to display individual trip curves on a computer monitor where the curve can be adjusted.

It is also known to download circuit breaker parameter values from a remote computer using network or serial communications. This potentially reduces the human errors associated with inserting the correct parameter values in the correct circuit breaker.

U.S. Pat. No. 6,005,757 discloses a microprocessor-based trip unit in which a microcomputer and transceiver communicate with another trip unit to acquire the predetermined settings of the other trip unit. The microcomputer includes a firmware routine which employs the acquired predetermined settings as its own predetermined values.

There is room for improvement in systems including circuit interrupter trip units.

SUMMARY OF THE INVENTION

This need and others are met by embodiments of the invention, which provide a settings emulator for a circuit interrupter trip unit.

In accordance with one aspect of the invention, a settings emulator for a circuit interrupter trip unit comprises: a handheld enclosure; a number of adjustable switches mounted with respect to the handheld enclosure, the number of adjustable switches defining a plurality of different settings; a communication channel mounted with respect to the handheld enclosure; and a processor enclosed by the handheld enclosure, the processor being structured to read the plurality of different settings from the number of adjustable switches and communicate the plurality of different settings through the communication channel to the circuit interrupter trip unit.

As another aspect of the invention, a settings emulator for a circuit interrupter trip unit comprises: an enclosure; a number of adjustable switches mounted with respect to the enclosure, the number of adjustable switches defining a plurality of different settings; a communication channel mounted with respect to the enclosure; and a processor enclosed by the enclosure, the processor being structured to read the plurality of different settings from the number of adjustable switches and communicate the plurality of different settings through the communication channel to the circuit interrupter trip unit, wherein the settings emulator is not a trip unit, and wherein the settings emulator mimics adjustable switch settings of the circuit interrupter trip unit.

As another aspect of the invention, a system comprises: a circuit interrupter trip unit comprising a first communication interface; and a settings emulator for the circuit interrupter trip unit, the settings emulator comprising: a handheld enclosure, a number of adjustable switches mounted with respect to the handheld enclosure, the number of adjustable switches defining a plurality of different settings, a second communication interface mounted with respect to the handheld enclosure and structured to communicate with the first communication interface of the circuit interrupter trip unit, and a processor enclosed by the handheld enclosure, the processor reading the plurality of different settings from the number of adjustable switches and communicating the plurality of different settings through the second communication interface to the first communication interface of the circuit interrupter trip unit.

The settings emulator may further comprise a switch; the processor may further communicate the plurality of different settings through the second communication interface to the first communication interface of the circuit interrupter trip unit responsive to the switch being activated; and the circuit interrupter trip unit may further comprise a nonvolatile memory storing the plurality of different settings therein.

The circuit interrupter trip unit may further comprise a nonvolatile memory storing the plurality of different settings therein; the settings emulator may further comprise a number of switches and a display; and the processor may further request and receive the plurality of different settings through the first and second communication interfaces and from the nonvolatile memory of the circuit interrupter trip unit responsive to the number of switches and display the plurality of different settings on the display.

The circuit interrupter trip unit may comprise no adjustable trip setting switches; and the number of adjustable switches of the settings emulator may temporarily provide adjustable switches to the circuit interrupter trip unit when the processor communicates the plurality of different settings between the first and second communication interfaces.

The second communication interface may supply power through the first communication interface and at least partially power the circuit interrupter trip unit for communications between the first and second communication interfaces.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

As employed herein, the term "number" shall mean one or an integer greater than one (i.e., a plurality).

As employed herein, the term "processor" means a programmable analog and/or digital device that can store, retrieve, and process data; a computer; a workstation; a personal computer; a microprocessor; a microcontroller; a microcomputer; a central processing unit; a mainframe computer; a mini-computer; a server; a networked processor; or any suitable processing device or apparatus.

As employed herein, the term "number of adjustable switches" refers to a single adjustable mechanical switch defining a plurality of different settings, or a plurality of adjustable mechanical switches defining a plurality of different settings. A non-limiting example of an adjustable switch is a rotary selector switch having a plurality of different outputs any one of which can be selected by the position of a rotatable rotary member. Another non-limiting example of an adjustable switch is a rotary selector switch having a plurality of different outputs any one of which can be selected by the position of a rotatable rotary member to define a plurality of different settings.

As employed herein, the term "mimics" means to closely or exactly imitate.

The invention is described in association with circuit breaker trip units, although the invention is applicable to a wide range of circuit interrupter trip units.

Figure 1:
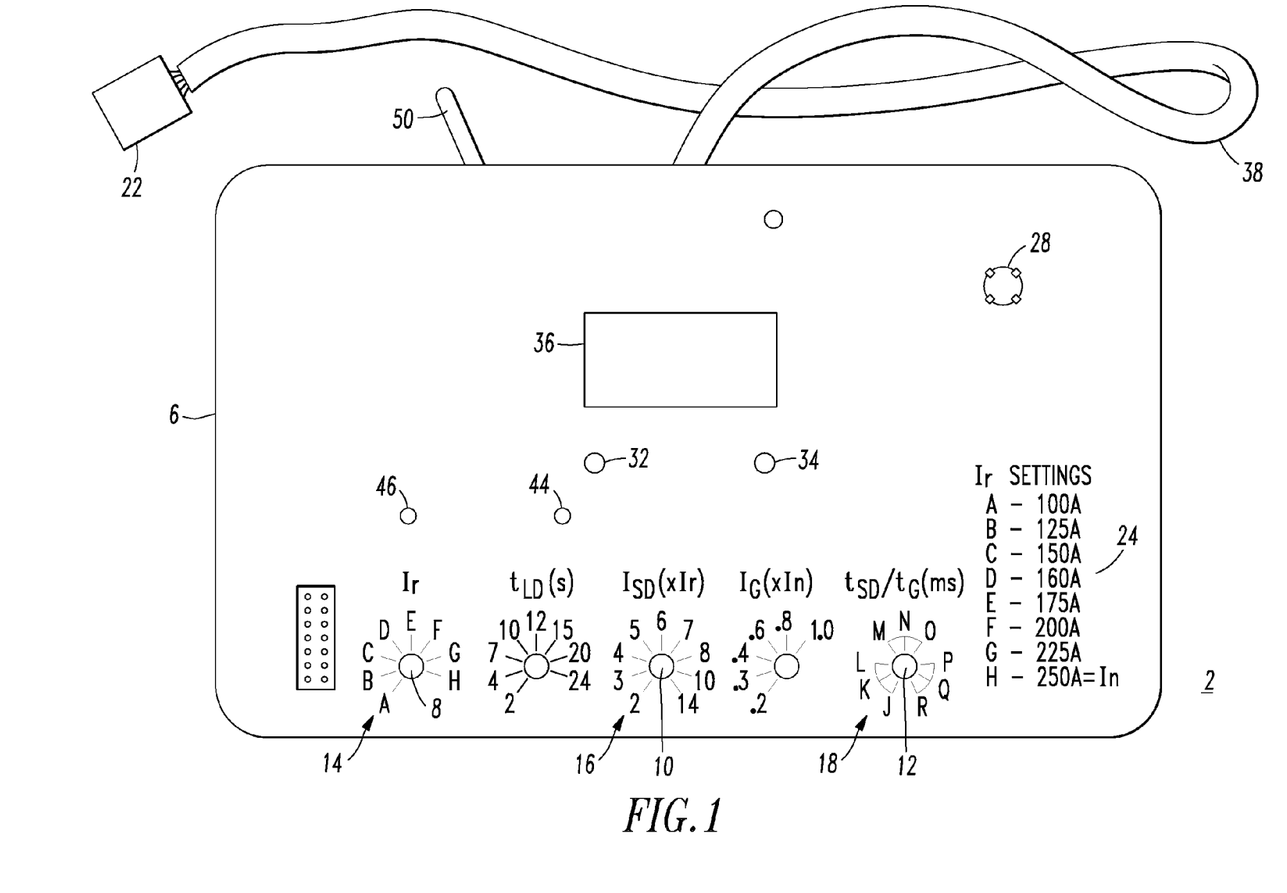
FIG. 1 is an isometric view of a switch settings emulator for a trip unit in accordance with an embodiment of the invention.
Figure 4:
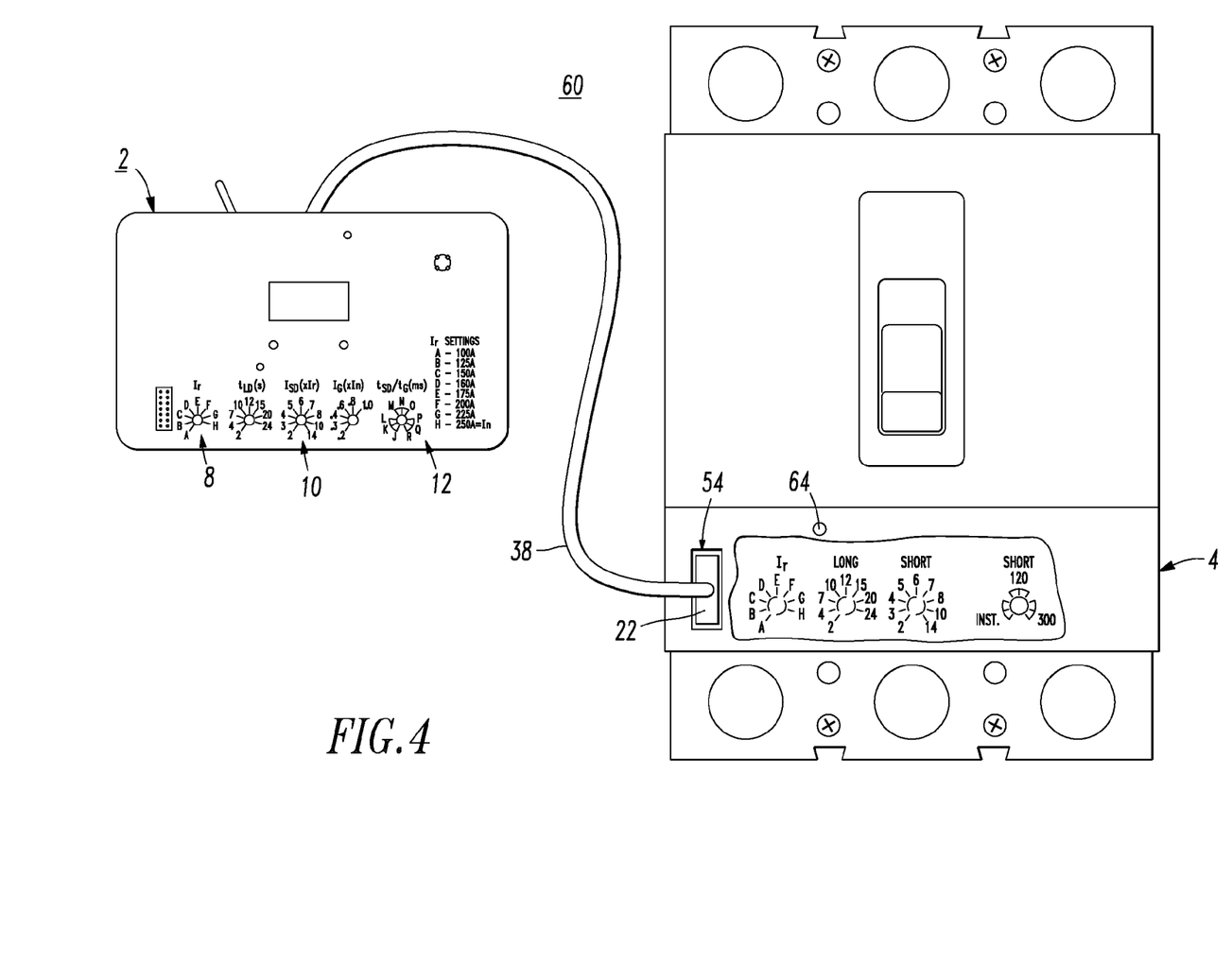
FIG. 4 is a simplified isometric view of the switch settings emulator of FIG. 1 connected to a circuit breaker trip unit.
Figure 5:
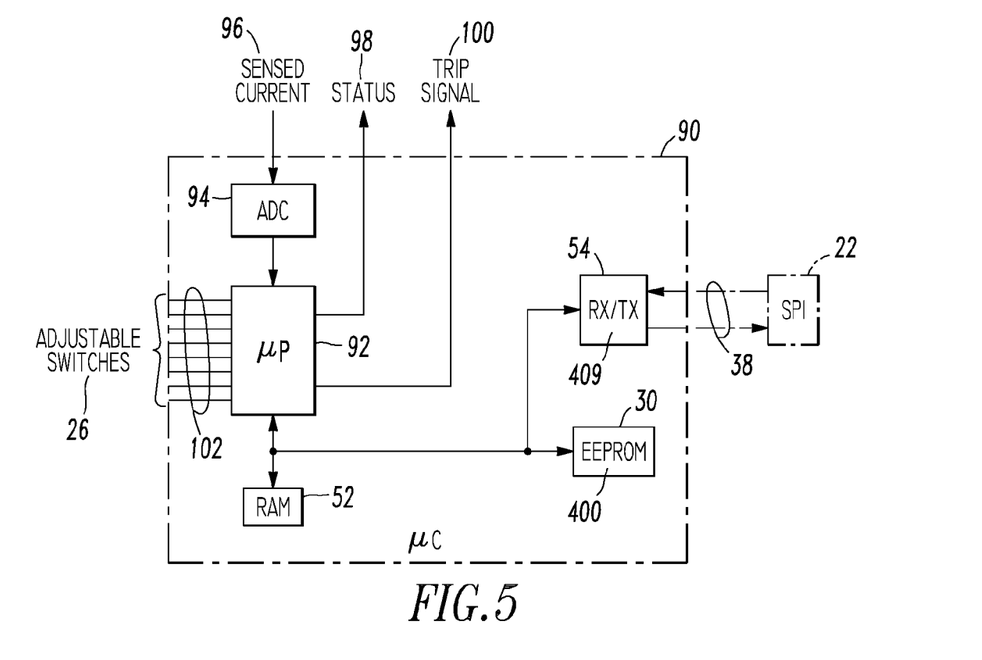
FIG. 5 is a block diagram in schematic form of a portion of the circuit breaker trip unit of FIG. 4.
Figure 7:
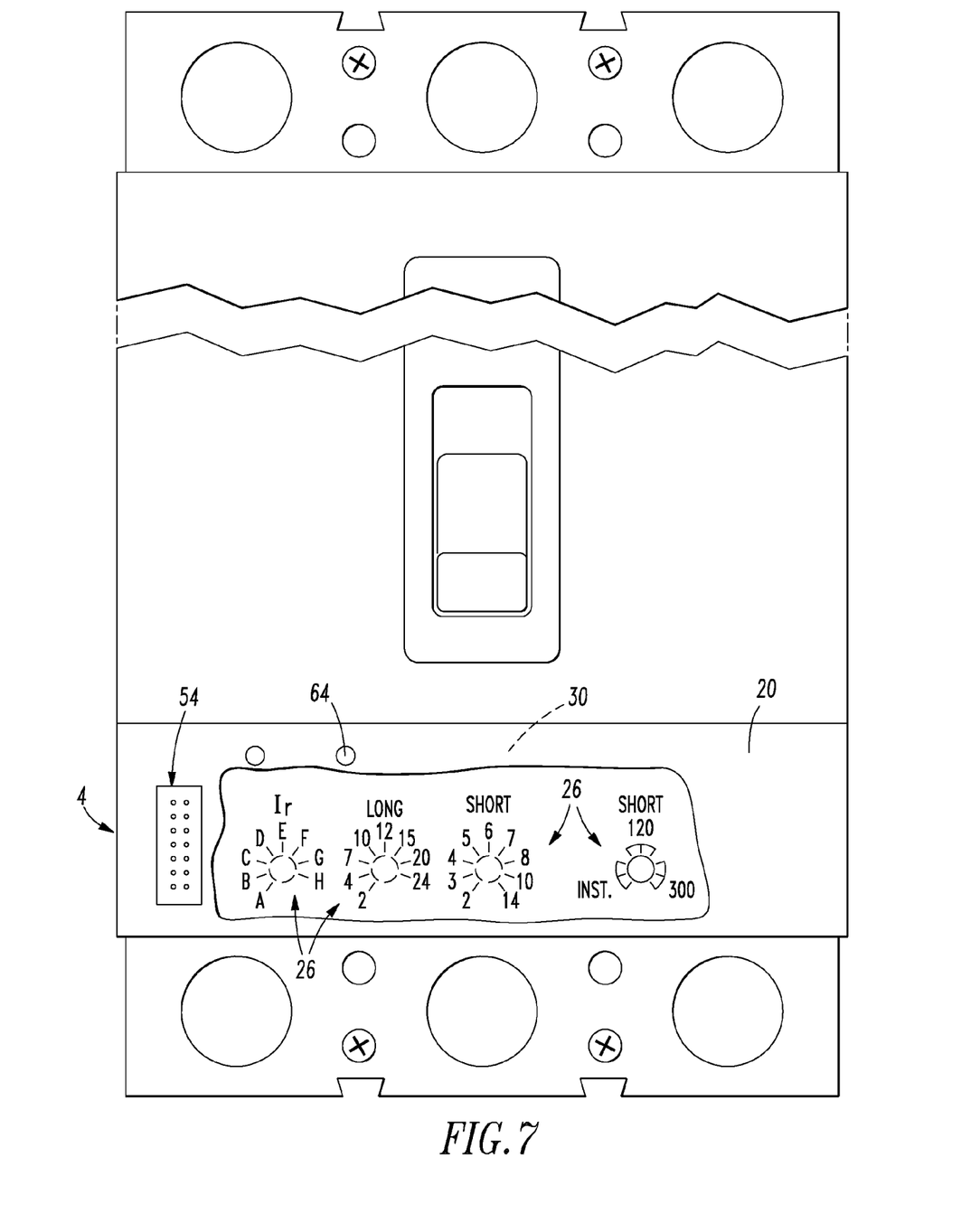
FIG. 7 is a vertical elevation view of the circuit breaker trip unit of FIG. 4.

FIG. 1 is an isometric view of a switch settings emulator 2 for a circuit breaker trip unit 4 (FIGS. 4, 5 and 7). The example settings emulator 2 includes an enclosure, such as a handheld enclosure 6, housing a number of adjustable (e.g., without limitation, rotary) switches 8,10,12, and an example set of corresponding labels 14,16,18, which switches 8,10,12 and labels 14,16,18 are preferably identical to those on a faceplate of a corresponding trip unit (e.g., see somewhat similar faceplate 20 of trip unit 4 of FIG. 7). The emulator 2 can be connected to the trip unit 4 through, for example, a Serial Port Interface (SPI) 22.

The labels of the example settings emulator 2 can vary. For example, the example Ir Settings are for a 250 A trip unit. The Ir label can vary for different frames (sensors), such as, for example, a 600 A frame or 1200 A frame. However, the adjustable switch settings are the same for all frames since functionality is based on a per unit basis. For example and without limitation, there can be three different trip unit ratings: (1) 225 A, 160 A and 80 A; (2) 250 A, 160 A, 100 A and 50 A; and (3) 600 A, 400 A and 250 A. Each of those ratings uses a corresponding different set of Ir Settings.

As will be described, the user of the emulator 2 can change the settings on the emulator faceplate 24 in the same or similar manner as would be performed through a number of adjustable switches of a trip unit (e.g., see the number of adjustable switches 26 of the trip unit 4 of FIG. 7, which are somewhat similar to the switches 8,10,12 of FIG. 1). After the user sets the adjustable switches 8,10,12 to the desired settings on the emulator 2, an emulation switch 28 (e.g., EMULATE button 28) is pressed and the switch settings are transferred to the trip unit 4 and stored in nonvolatile memory 30 (e.g., EEPROM 30 of FIG. 5) therein. Also, by pressing two switches 32,34 (e.g., SCROLL button 32; RESET button 34) in the proper sequence, as will be described, or though any other suitable user interface (not shown), the user can verify the setting changes by viewing the new settings on a display 36 of the emulator 2. As a result, the functions of the electronic trip unit 4 are set to the desired switch settings based upon the values selected through the emulator faceplate 24.

Figure 2:
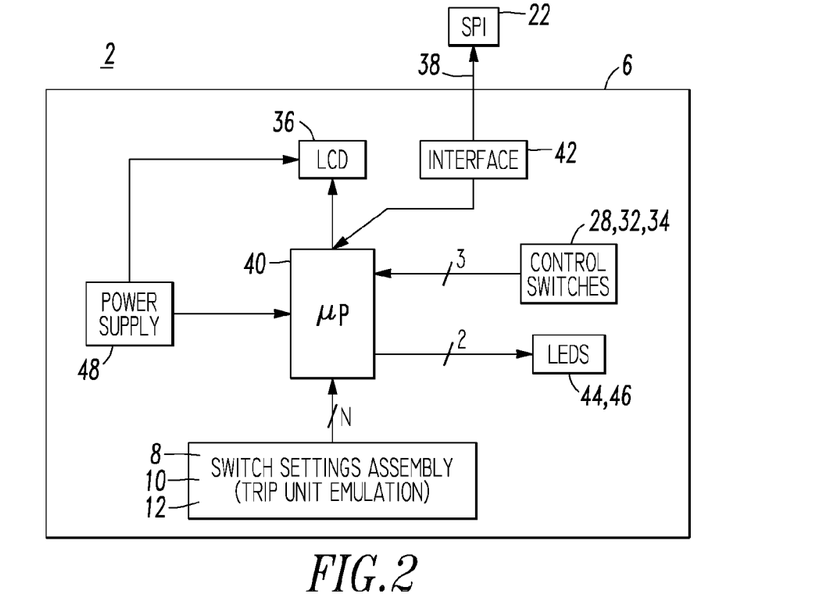
FIG. 2 is a block diagram in schematic form of the switch settings emulator of FIG. 1.

Also referring to FIG. 2, the adjustable switches 8,10,12 are mounted with respect to the enclosure 6 and define a plurality of different settings (e.g., without limitation, a plurality of different long delay pickup settings; a plurality of different short delay pickup settings; a plurality of different short delay time settings). For example, the adjustable switch 8 is a long delay pickup adjustable switch, the adjustable switch 10 is a short delay pickup adjustable switch, and the adjustable switch 12 is a short delay time adjustable switch.

A communication channel 38 (e.g., a communication interface) for the Serial Port Interface (SPI) 22 is mounted with respect to the enclosure 6. A processor, such as a microprocessor (μP) 40, is enclosed by the enclosure 6. The μP 40 is structured to read the different settings from the adjustable switches 8,10,12 and communicate the different settings through the communication channel 38 to the circuit interrupter trip unit 4 (FIG. 7). In this example, the communication channel 38 is a wired communication channel, although a wide range of different types of communication channels are possible.

Although the example settings emulator 2 is not a trip unit, it mimics adjustable switch settings of a circuit interrupter trip unit, such as trip unit 4 (FIG. 7).

The μP 40 of FIG. 2 also receives inputs from the control switches 28,32,34, and outputs to the display 36 (e.g., without limitation, a liquid crystal display (LCD)), and to various indicators, such as the example light emitting diodes (LEDs) 44,46. A suitable power supply 48 (e.g., without limitation, a battery) powers the display 36, the μP 40, the interface 42 and the LEDs 44,46. Preferably, the power supply 48 includes a suitable on/off switch 50 (FIG. 1).

Example 1

Figure 9:
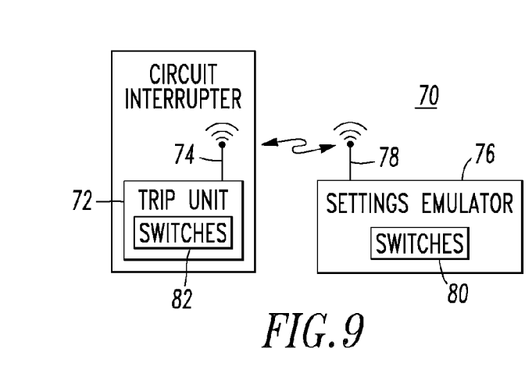
FIG. 9 is a block diagram in schematic form of another settings emulator and another circuit breaker trip unit in accordance with another embodiment of the invention.

The example settings emulator 2 includes a suitable interface 42 between the μP 40 and the communication channel 38. For example, the interface 42 can be structured to provide a wireless communication channel 78 (FIG. 9).

Example 2

Each of the adjustable switches 8,10,12 can define a number of the different settings.

Example 3

The adjustable switches 8,10,12 can include a long delay time adjustable switch 8, a ground fault pickup adjustable switch 10, and a ground fault time adjustable switch 12.

Example 4

Each of the adjustable switches 8,10,12 can define a plurality of different settings. For example and without limitation, depending on the type of trip unit, such as 4, the count of the adjustable switches can be up to five. A number of the adjustable switches can have a dual function depending on the type. The adjustable switches may have various different counts of possible settings. For example, Ir may have eight settings, LDT may have eight settings, SDPU may have nine settings, GFPU may have six settings, and the fifth adjustable switch may have nine settings.

For one type of trip unit, the fifth adjustable switch has a dual function as follows: nine positions (time) are used in a dual concentric ring labeling technique. The outside ring represents SDT (Short Delay Time) and the first three positions are labeled INST (Instantaneous), the next three positions are 120 ms, and the last three positions are 300 ms. The inside ring represents GFT (Ground Fault Time) and the first three positions are INST, 120 ms and 300 ms. This pattern repeats from the fourth to the sixth positions, and from the seventh to the ninth positions. In this example, the second position would select SDT to be INST (since the first three positions are labeled INST for SDT) and would also select GFT to be 120 ms (since the second position corresponds to that time).

In addition to the possible differences in frames (sensors), there can also be different types of trip units. Each of these types can include a different number of adjustable switches. The example settings emulator 2 can include, for example, different labels based on the type of trip unit (circuit breaker).

Example 5

Figure 3A:
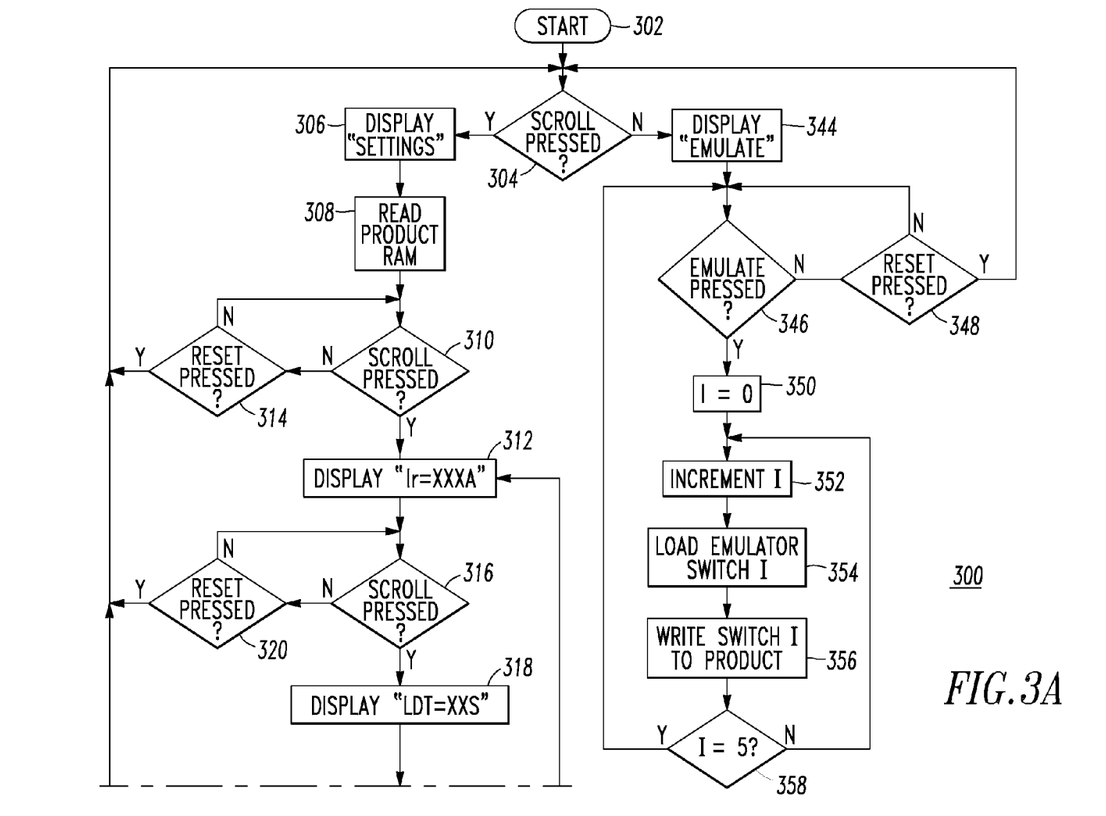
FIGS. 3A-3B form a flowchart of a routine executed by the microcomputer of FIG. 2.
Figure 3B:
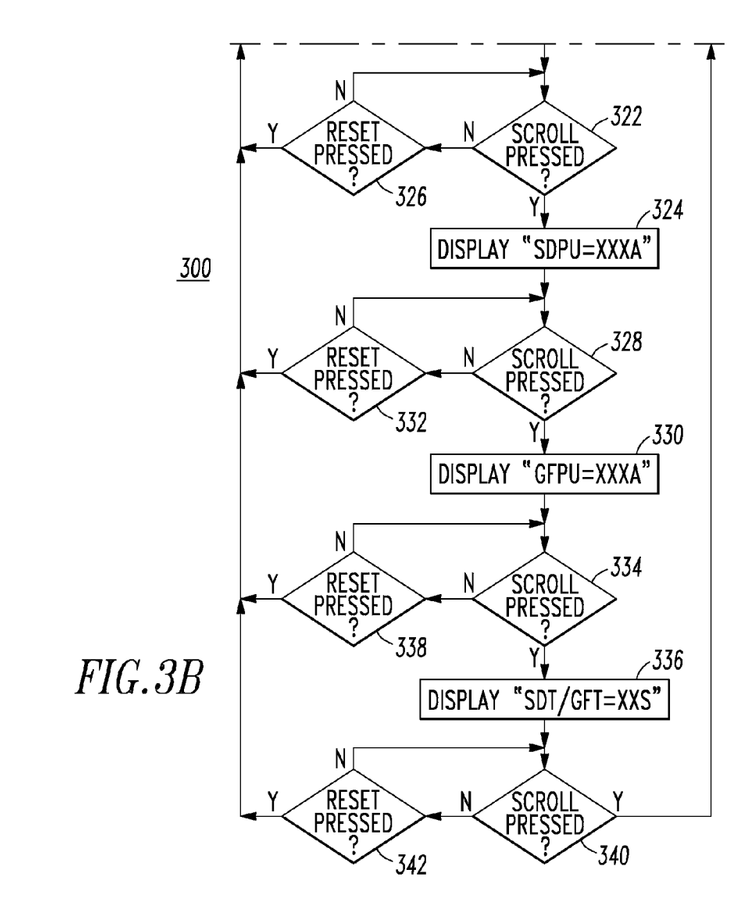

FIGS. 3A-3B show a routine 300 for the μP 40 of FIG. 2. The routine 300 starts, at 302, after which it is determined if the SCROLL button 32 (FIG. 1) is pressed, at 304. If so, then, at 306, "SETTINGS" is output to the display 36 (FIG. 1) and, at 308, the trip unit EEPROM 30 (FIG. 5) is read. Next, at 310, it is determined if the SCROLL button 32 is pressed. If so, then, at 312, "Ir=XXXA" (e.g., XXX is 000 to 999 amperes) is output to the display 36 (FIG. 1). Otherwise, it is determined if the RESET button 34 (FIG. 1) is pressed, at 314. If so, then, step 304 is repeated. Otherwise, step 310 is repeated.

After 312, it is determined if the SCROLL button 32 is pressed at 316. If so, then, at 318, "LDT=XXs" (e.g., XX is 00 to 99 seconds) is output to the display 36 (FIG. 1). Otherwise, it is determined if the RESET button 34 is pressed, at 320. If so, then, step 304 is repeated. Otherwise, step 316 is repeated.

After 318, it is determined if the SCROLL button 32 is pressed at 322. If so, then, at 324, "SPDU=XXXA" (e.g., XXX is 000 to 999 amperes) is output to the display 36 (FIG. 1). Otherwise, it is determined if the RESET button 34 is pressed, at 326. If so, then, step 304 is repeated. Otherwise, step 322 is repeated.

After 324, it is determined if the SCROLL button 32 is pressed at 328. If so, then, at 330, "GFPU=XXXA" (e.g., XXX is 000 to 999 amperes) is output to the display 36 (FIG. 1). Otherwise, it is determined if the RESET button 34 is pressed, at 332. If so, then, step 304 is repeated. Otherwise, step 328 is repeated.

After 330, it is determined if the SCROLL button 32 is pressed at 334. If so, then, at 336, "SDT/GFT=XXs" (e.g., XX is 00 to 99 seconds) is output to the display 36 (FIG. 1). Otherwise, it is determined if the RESET button 34 is pressed, at 338. If so, then, step 304 is repeated. Otherwise, step 334 is repeated.

After 336, it is determined if the SCROLL button 32 is pressed at 340. If so, then, step 312 is repeated. Otherwise, it is determined if the RESET button 34 is pressed, at 342. If so, then, step 304 is repeated. Otherwise, step 340 is repeated.

On the other hand, if the test failed at 304, then, at 344, "EMULATE" is output to the display 36 (FIG. 1). Next, at 346, it is determined if the EMULATE button 28 is pressed. If so, then, at 350, a variable I is set to zero. Next, at 352, the variable I is incremented. Then, at 354, a corresponding emulator switch I (e.g., one of the adjustable switches 8,10,12) is loaded and, at 356, that switch I is written to the trip unit 4. This causes the μP 40 to communicate the different settings through the communication interface 42 to a communication interface 54 (FIG. 7) of the circuit interrupter trip unit 4 responsive to the EMULATE button 28 being activated. The circuit interrupter trip unit 4 includes a nonvolatile memory 30 (shown in hidden line drawing in FIG. 7) storing the different settings therein.

Next, at 358, it is determined if the variable I is five. If so, then step 346 is repeated. Otherwise, step 352 is repeated.

On the other hand, if the EMULATE button 28 was not pressed, at 346, then it is determined if the RESET button 34 is pressed at 348. If so, then step 304 is repeated. Otherwise, step 346 is executed.

Referring to FIGS. 1, 2, 3A, 3B, 4, 5 and 7, the μP 40 requests and receives the different settings through the first and second communication interfaces 42,54 and from the nonvolatile memory 30 of the circuit interrupter trip unit 4 responsive to switches 32,34 and displays the different settings on the display 36. The μP 40 reads the SCROLL button 32 and displays another one of the different settings on the display 36 responsive to a change in state of the SCROLL button 32 at steps 310, 316, 322, 328, 334 and 340 of FIGS. 3A-3B.

For example, even steps 310-314, 322-326 and 334-338 cause the μP 40 to display the different settings from the circuit interrupter trip unit 4 corresponding to each of the example long delay pickup adjustable switch 8, the short delay pickup adjustable switch 10, and the short delay time adjustable switch 12.

The μP 40 communicates the different settings through the communication interface 42 to the communication interface 54 of the circuit interrupter trip unit 4 responsive to the EMULATE button 28 being activated, as is detected at step 346 of FIG. 3A.

In order to determine the previously programmed switch settings of the trip unit 4, the user presses the RESET button 34, which is detected at step 348 of FIG. 3A, and, also, presses the SCROLL button 32, which is detected at step 304, after which the user releases the RESET button 34. As long as the RESET button 34 is pressed, the μP 40 is in hardware reset and nothing will happen. A reset vector forces the program into a "SETTINGS" mode if the SCROLL button 32 is pressed. If the SCROLL button 32 is pressed and the on/off switch 50 is turned on, then the "SETTINGS" mode is also selected. After entering the "SETTINGS" mode, the SCROLL button 32 is pressed to advance to the Ir setting or any setting. The display 36 preferably briefly displays the family and/or the type of circuit interrupter that belongs to the family. For example, by reading the circuit interrupter RAM 52 (FIG. 5), a frame byte is known and the specific type can be displayed, followed by "SETTINGS" at 306. At this point, the previously programmed switch settings can be viewed by continually pressing the SCROLL button 32, which is detected at steps 310,316,322,328,334,340. The display 36 displays, with each subsequent press of the SCROLL button 32, for example and without limitation, the Ir setting at 312 (e.g., without limitation, one of eight different values in amperes; 40% to 100% of the current sensor rating), the LDT setting at 318 (e.g., without limitation, one of eight different values in seconds; 2 seconds to 24 seconds), the SDPU setting at 324 (e.g., without limitation, one of nine different multiple values; 2×Ir to 10×Ir), the GFPU setting at 330 (e.g., without limitation, one of six different values in amperes; 20% to 100% of the current sensor rating), and the SDT/GFT setting at 336 (e.g., without limitation, one of nine different settings as discussed above in connection with Example 4), and then wraps around and repeats this sequence. The "SETTINGS" mode is exited by pressing only the RESET button 34, which is detected at any of steps 314,320,326,332,338,342, after which the display 36 displays "EMULATE" at 344.

In order to program new switch settings into the trip unit 4, the user adjusts the adjustable switches 8,10,12 on the settings emulator 2 to the new desired settings and presses (e.g., for any suitable time period; for about one-half second) and releases the EMULATE button 28, which is detected at 346 of FIG. 3A. These newly programmed switch settings of the trip unit 4 can be verified by returning to the "SETTINGS" mode as was described above (e.g., even steps 304-342 of FIGS. 3A-3B).

FIG. 4 shows the switch settings emulator 2 of FIG. 1 connected to the example circuit breaker trip unit 4. The settings emulator communication channel 38 (e.g., cable 38 in this example) is plugged into the communication interface 54 (e.g., test port 54) of the trip unit 4 (or to a suitable communication interface of a circuit interrupter (not shown)), as shown in FIG. 4. This connection establishes communications between the two devices 2,4 through the example Serial Port Interface (SPI) 22 (FIGS. 1 and 2), although any suitable interface (e.g., without limitation, parallel; serial; wired; wireless) may be employed. Preferably, the connection supplies power through the communication channel 38 and at least partially powers the circuit interrupter trip unit 4 for communications between the communication channel 38 and the communication interface 54 in the event that the trip unit 4 is not already powered up.

A system 60 includes the circuit interrupter trip unit 4 having the communication interface 54 and the settings emulator 2 having the communication channel 38, which is structured to communicate with the trip unit communication interface 54. The emulator μP 40 (FIG. 2) reads the different settings from the adjustable switches 8,10,12 and communicates the different settings through the communication channel 38 to the trip unit communication interface 54.

As shown in FIG. 7, the circuit interrupter trip unit 4 can include a number of adjustable switches 26. Preferably, the adjustable switches 8,10,12 of the settings emulator 4 (FIG. 1) mimic the circuit interrupter trip unit adjustable switches 26, as is best disclosed, below, in connection with FIG. 9.

The settings emulator status indicator 44 (FIG. 1) and a trip unit status indicator 64 (FIG. 7) are both active responsive to the SPI 22 (FIG. 2) and the trip unit communication interface 54 being connected and powered. For example, when the example SPI connection is made to the trip unit 4, and the emulator power is turned on through the power switch 50 (FIG. 1), the status indicators 44,64 (e.g., green light emitting diodes (LEDs)) begin blinking (e.g., one second on; one second off). Also, the display 36 of the emulator 2 displays "EMULATE" as was discussed above in connection with step 344 of FIG. 3A.

Example 6

As shown in FIG. 9, another system 70 includes another circuit interrupter trip unit 72 having a wireless communication interface 74 and another settings emulator 76, which is similar to the settings emulator 2 of FIG. 1, except that it has a wireless communication channel 78, which is structured to communicate with the trip unit wireless communication interface 74, and except that the number of adjustable switches 80 of the settings emulator 76 are identical to the number adjustable switches 82 of the circuit interrupter trip unit 72.

Example 7

The example settings emulators 2,76 of FIGS. 1 and 9 may include a number of the five example adjustable switches. For example, FIG. 1 shows Ir, SDPU and SDT adjustable switches 8,10,12. As another example, the routine 300 of FIGS. 3A-3B shows all the settings for a trip unit, including Ir, LDT, SDPU, GFPU and SDT/GFT.

FIG. 5 shows a portion of the circuit breaker trip unit 4 of FIG. 4. The trip unit 4 includes a microcomputer (μC) 90 having a microprocessor (μP) 92, an analog-to-digital converter (ADC) 94, RAM 52, EEPROM 30, and the communication interface (RX/TX) 54, which connects to the settings emulator SPI 22 (shown in phantom line drawing) through the example cable 38 (shown in phantom line drawing). As is conventional, the trip unit μP 92 inputs a sensed current signal 96 through the ADC 94, and outputs a status signal 98 to the indicator 64 (FIG. 7) and a trip signal 100. The trip unit μP 92 also can input settings from the number of adjustable switches 26 through a plurality of ports 102.

Figure 6:
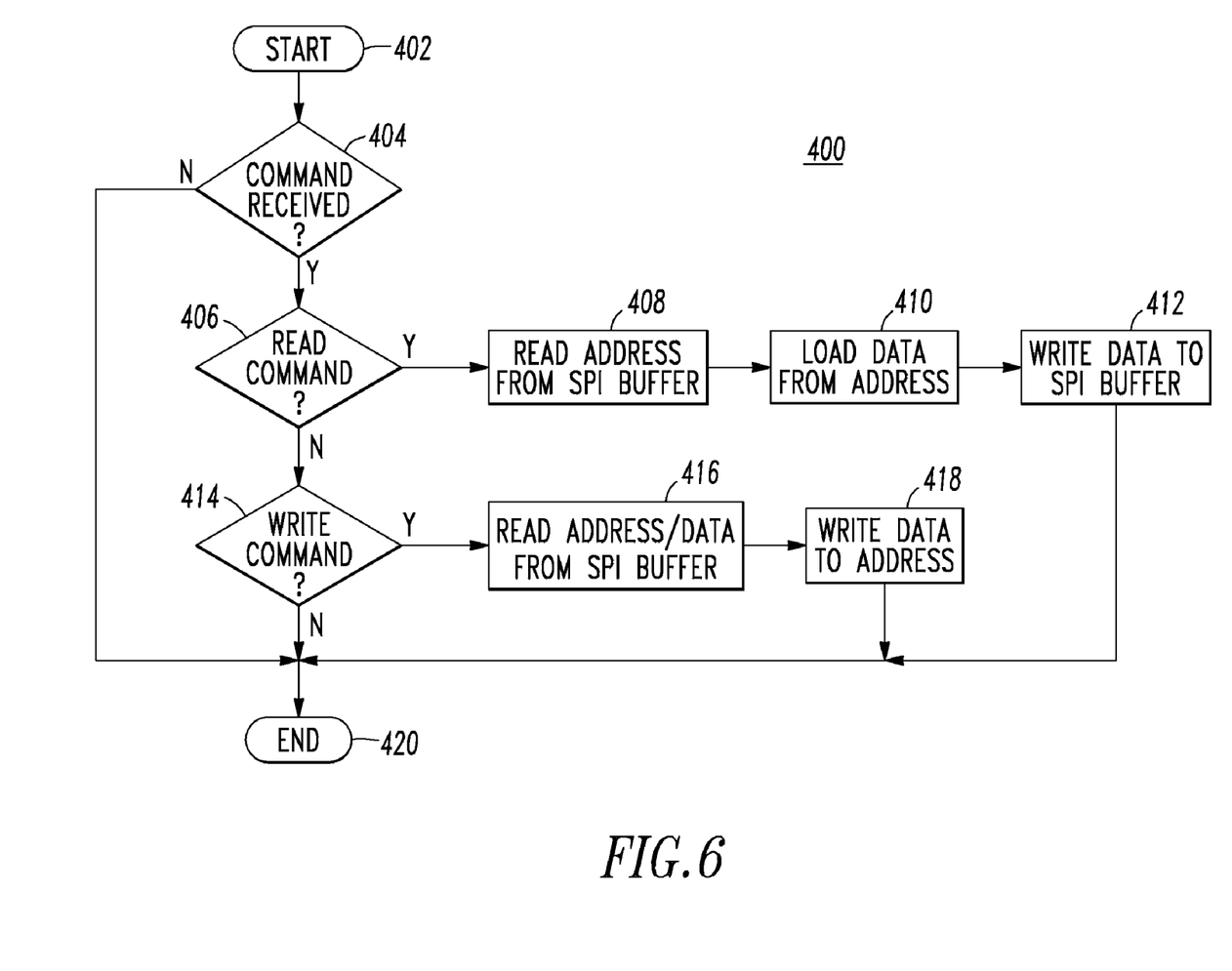
FIG. 6 is a flowchart of firmware executed by the microcomputer of FIG. 5.

FIG. 6 shows an SPI routine 400 executed by the μP 92 of FIG. 5 to provide the read/write interface to the SPI communication channel 38 of FIGS. 2 and 5. As a non-limiting example, the SPI routine 400 can be executed as part of a periodic interrupt service routine (not shown) of the μP 92, which is typically executed a plurality of times (e.g., without limitation, 15) per line cycle. If the trip unit 4 (FIG. 7) includes the adjustable switches 26, then those switches are read as part of a background routine (not shown) of the μP 92, which is typically executed once per line cycle. The routine 300 starts at 402, after which it determines if a read or write command, for example, was received from the settings emulator 2 (FIG. 1) at 404. If so, then the routine 300 determines if the command is a read command at 406. If so, then, at 408, an address is read from an SPI buffer 409 (FIG. 5). Then, at 410, data is loaded from EEPROM 30 at that address after which the data is written, at 412, to the SPI buffer 409. In turn, the communication interface 54 sends the data to the SPI communication channel 38. After 412, or if no command was received at 404, the routine 400 ends (e.g., returns) at 420.

If the test failed at 406, then, at 414, it is determined if the command is a write command at 414. If so, then at 416, address and data are read from the SPI buffer 409 (FIG. 5). Next, at 418, that data is loaded into EEPROM 30 at that address after which the routine 400 ends at 420.

Example 8

Certain values can be programmed into trip unit EEPROM 30 during factory calibration and testing. For instance, two option bytes (not shown) define trip unit functionality. For example and without limitation, the first option byte can define the time-current relationship of a line protector, while the second option byte can describe the trip unit as acting as a motor protector. Other programmed values can include, for example and without limitation, frame (current sensor rating), calibration factors, and internal trip temperature.

When the trip unit 4 or trip unit 4' (FIG. 8) is powered up, these values are read from EEPROM 30 into RAM 52, in order to be used in the trip unit program. Also, as this program executes, these values are refreshed at certain anniversaries. For example and without limitation, the two option bytes, the frame, the calibration factors and the internal trip temperature are read into RAM 52 every 960 sample times corresponding to about one second (e.g., a sample is taken every 1.11 ms).

The adjustable switches 26 are connected to I/O pins (not shown) of the trip unit μP 92, are read at power up, and then every 15 sample times, which corresponds to one 60 Hz line cycle. For a conventional trip unit, such as 4, with the local trip unit adjustable switches 26, a switch read routine (not shown) is called in the main or background routine (not shown) and returns the local trip unit adjustable switch settings to trip unit RAM 52 (e.g., without limitation, at locations SW1, SW2, SW3, SW4 and SW5) (not shown). The trip unit program then uses these settings to look up current-time information stored in tables or pointers to tables (not shown).

The switch read routine (not shown) identifies whether the adjustable switches 26 are to be read, as is conventional, or if it should revert to another internal switch read mode. This can be accomplished, for example and without limitation, in hardware or in firmware. For example, a hardware technique pulls a port pin (not shown) of the trip unit μP 92 low by the switch settings emulator 2. This port pin is read in the period interrupt service routine (not shown) and a flag (not shown) is set. Upon entering the switch read routine, the flag is read and, if set, the conventional switch read mode is skipped and the other internal switch mode is executed. The adjustable switch settings are then read from the switch settings emulator 2.

Alternatively, a byte can be written into trip unit EEPROM 30 by the switch settings emulator 2. When the trip unit 4,4' reads this byte, it enters into the other internal switch read mode. In this manner, the trip unit 4 can be used with the external adjustable switches 26 (or with the switch settings emulator 2), or the trip unit 4' can be used without any external adjustable switches on that trip unit, since it only uses the switch settings emulator 2.

The switch settings on the switch settings emulator 2 are transferred via the SPI 22 to the trip unit 4,4' and are written into the trip unit EEPROM 30. In the other internal switch read mode, these settings are read from the trip unit EEPROM 30 into the trip unit RAM 52 (e.g., without limitation, at locations SW1, SW2, SW3, SW4 and SW5) (not shown). The trip unit program then uses these settings to look up current-time information stored in tables or pointers to tables (not shown).

Figure 8:
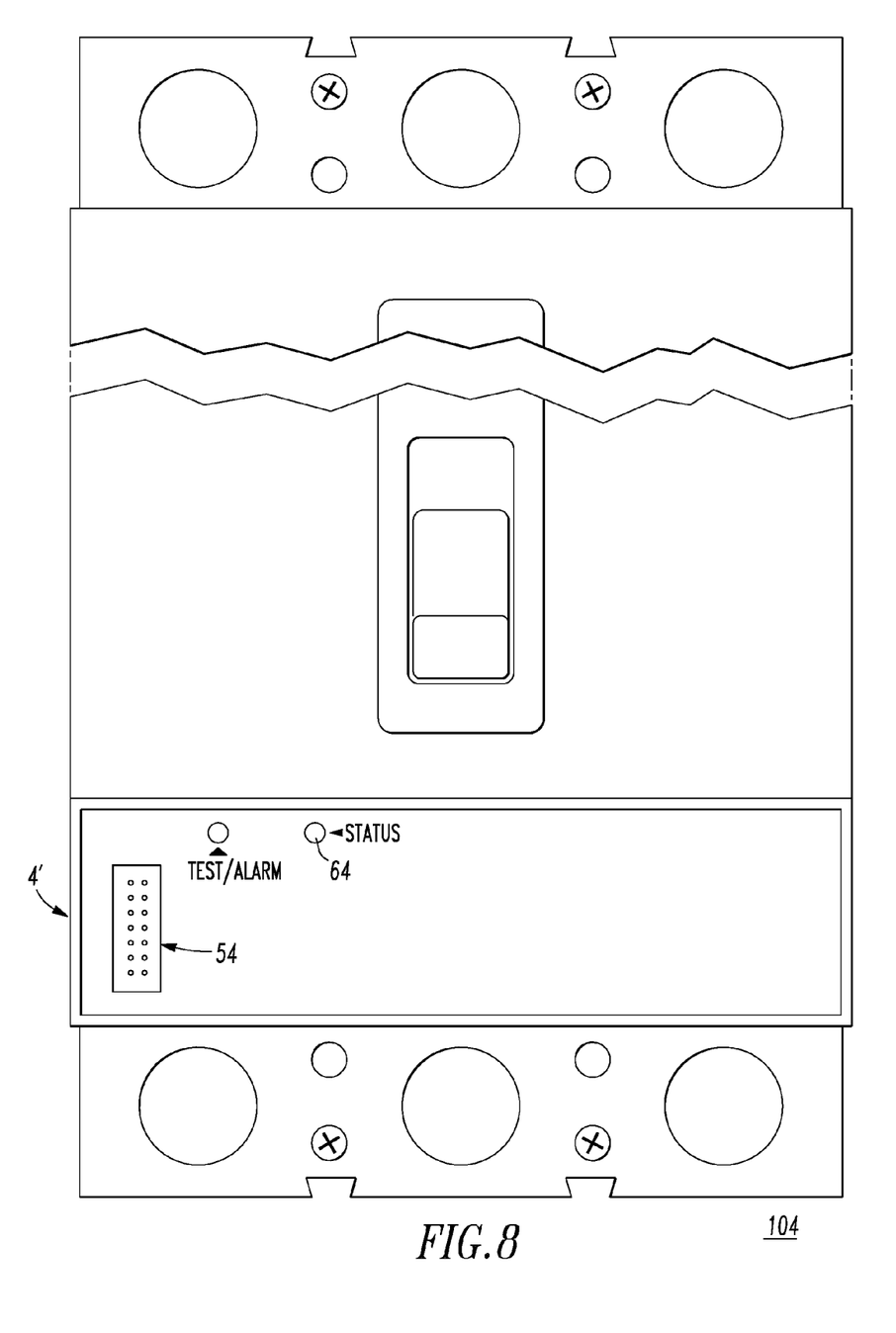
FIG. 8 is a vertical elevation view of another circuit breaker trip unit in accordance with another embodiment of the invention.

FIG. 8 shows another circuit breaker trip unit 4', which is similar to the trip unit 4 of FIG. 7, except that the trip unit 4' and the associated circuit interrupter 104 do not require the adjustable switches 26 of FIG. 7. Elimination of those switches 26 decreases production costs due to material savings (e.g., up to five example switches), reduces testing costs and results in process savings (e.g., reduced manufacturing costs). Here, when the settings emulator 2 (FIG. 1) is used with the trip unit 4' (in the same manner as was discussed, above, in connection with the trip unit 4 of FIG. 4), the adjustable switches 8,10,12 of the settings emulator 2 temporarily provide adjustable switches to the circuit interrupter trip unit 4' when the μP 40 (FIG. 2) communicates the different settings between the communication channel 38 and the communication interface 54.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A settings emulator for a circuit interrupter trip unit, said settings emulator comprising:
   a handheld enclosure;
   a first plurality of adjustable switches mounted with respect to said handheld enclosure, said first plurality of adjustable switches defining a plurality of different settings;
   a communication channel mounted with respect to said handheld enclosure;

a processor enclosed by said handheld enclosure, said processor being structured to read said plurality of different settings from said first plurality of adjustable switches and communicate said plurality of different settings through said communication channel to said circuit interrupter trip unit; and a second switch, wherein said processor is further structured to repetitively communicate said plurality of different settings through said communication channel to said circuit interrupter trip unit responsive to said second switch being continuously activated.

2. The settings emulator of claim 1 wherein said communication channel is a wired communication channel.

3. The settings emulator of claim 1 wherein said communication channel is a wireless communication channel.

4. The settings emulator of claim 1 wherein each of said first plurality of adjustable switches defines a number of said different settings.

5. The settings emulator of claim 1 wherein said first plurality of adjustable switches include a long delay time adjustable switch, a ground fault pickup adjustable switch, and a ground fault time adjustable switch.

6. A settings emulator for a circuit interrupter trip unit, said settings emulator comprising:

an enclosure;

a first plurality of adjustable switches mounted with respect to said enclosure, said first plurality of adjustable switches defining a plurality of different settings;

a communication channel mounted with respect to said enclosure;

a processor enclosed by said enclosure, said processor being structured to read said plurality of different settings from said first plurality of adjustable switches and communicate said plurality of different settings through said communication channel to said circuit interrupter trip unit; and a second switch, wherein said settings emulator is not a trip unit, wherein said settings emulator mimics adjustable switch settings of said circuit interrupter trip unit, and wherein said processor is further structured to repetitively communicate said plurality of different settings through said communication channel to said circuit interrupter trip unit responsive to said second switch being continuously activated.

7. The settings emulator of claim 6 wherein each of said first plurality of adjustable switches defines a number of said different settings.

8. The settings emulator of claim 6 wherein said first plurality of adjustable switches include a long delay time adjustable switch, a ground fault pickup adjustable switch, and a ground fault time adjustable switch.

9. A system comprising:

a circuit interrupter trip unit comprising a first communication interface; and a settings emulator for said circuit interrupter trip unit, said settings emulator comprising:

a handheld enclosure, a first plurality of adjustable switches mounted with respect to said handheld enclosure, said first plurality of adjustable switches defining a plurality of different settings, a second communication interface mounted with respect to the handheld enclosure and structured to communicate with the first communication interface of said circuit interrupter trip unit, a processor enclosed by said handheld enclosure, said processor reading said plurality of different settings from said first plurality of adjustable switches and communicating said plurality of different settings through said second communication interface to the first communication interface of said circuit interrupter trip unit, and a second switch, wherein said processor is further structured to repetitively communicate said plurality of different settings through said second communication interface to said first communication interface responsive to said second switch being continuously activated.

10. The system of claim 9 wherein said circuit interrupter trip unit further comprises a nonvolatile memory storing said plurality of different settings therein.

11. The system of claim 9 wherein said circuit interrupter trip unit further comprises a nonvolatile memory storing said plurality of different settings therein; wherein said settings emulator further comprises a third switch and a display; and wherein said processor further requests and receives said plurality of different settings through said first and second communication interfaces and from the nonvolatile memory of said circuit interrupter trip unit responsive to said second and third switches and displays said plurality of different settings on said display.

12. The system of claim 9 wherein said circuit interrupter trip unit comprises a plurality of adjustable switches; and wherein said first plurality of adjustable switches of said settings emulator mimics said plurality of adjustable switches of said circuit interrupter trip unit.

13. The system of claim 9 wherein said circuit interrupter trip unit comprises no adjustable trip setting switches; and wherein said first plurality of adjustable switches of said settings emulator temporarily provides adjustable switches to said circuit interrupter trip unit when said processor communicates said plurality of different settings between said first and second communication interfaces.

14. The system of claim 9 wherein said first and second communication interfaces are Serial Port Interfaces.

15. The system of claim 14 wherein both of said circuit interrupter trip unit and said settings emulator further comprise a status indicator which is active responsive to said Serial Port Interfaces being connected and powered.

16. The system of claim 9 wherein said first and second communication interfaces are wired communication interfaces.

17. The system of claim 9 wherein said first and second communication interfaces are wireless communication interfaces.

18. The system of claim 9 wherein said circuit interrupter trip unit comprises a plurality of adjustable switches; and wherein said first plurality of adjustable switches of said settings emulator are identical to said plurality of adjustable switches of said circuit interrupter trip unit.

19. The system of claim 9 wherein said second communication interface supplies power through said first communication interface and at least partially powers said circuit interrupter trip unit for communications between said first and second communication interfaces.

20. The system of claim 9 wherein said circuit interrupter trip unit further comprises a nonvolatile memory storing said plurality of different settings therein; wherein said settings emulator further comprises a display; and wherein said processor further receives said plurality of different settings from said second communication interface, as communicated from the nonvolatile memory of said circuit interrupter trip unit through said first communication interface, and sequentially displays each of said plurality of different settings on said display.

21. The system of claim 20 wherein said settings emulator further comprises a third switch; and wherein said processor further reads said third switch and displays another one of said plurality of different settings on said display responsive to a change in state of said third switch.

22. The system of claim 21 wherein said first plurality of adjustable switches include a long delay pickup adjustable switch, a short delay pickup adjustable switch, and a short delay time adjustable switch; and wherein said processor further displays said plurality of different settings from said circuit interrupter trip unit corresponding to each of said long delay pickup adjustable switch, said short delay pickup adjustable switch, and said short delay time adjustable switch.

* * * * *